United States Patent [19]
Lee

[11] Patent Number: 5,805,331
[45] Date of Patent: Sep. 8, 1998

[54] ACTUATED MIRROR HAVING AN INCREASED TILTING ANGLE

[75] Inventor: Hwa-Sun Lee, Seoul, Rep. of Korea

[73] Assignee: Daewoo Electronics Co., Ltd., Seoul, Rep. of Korea

[21] Appl. No.: 883,132

[22] Filed: Jun. 27, 1997

[30] Foreign Application Priority Data

Jun. 29, 1996 [KR] Rep. of Korea ....................... 96-26157

[51] Int. Cl.[6] ............................ G02B 26/00; G02B 7/182
[52] U.S. Cl. ............................................. 359/295; 559/850
[58] Field of Search .................................... 359/290–295, 359/846–855

[56] References Cited

U.S. PATENT DOCUMENTS

| 5,606,452 | 2/1997 | Min | 359/295 |
| 5,610,773 | 3/1997 | Min | 359/295 |

FOREIGN PATENT DOCUMENTS

| 0652455 | 5/1995 | European Pat. Off. . |
| 0741310 | 11/1996 | European Pat. Off. . |
| 2308458 | 6/1997 | United Kingdom . |
| 9523352 | 8/1995 | WIPO . |

Primary Examiner—Georgia Y. Epps
Assistant Examiner—Michael A. Lucas
Attorney, Agent, or Firm—Pennie & Edmonds LLP

[57] ABSTRACT

An inventive array of thin film actuated mirrors is provided with an active matrix, an array of actuating structures and an array of thin film mirrors, wherein the actuating structure is provided with a pair of side actuators and the center actuator, both ends of the side actuators being fixed to the active matrix, the upper thin film electrode of the side actuator electrically being connected to the lower thin film electrode of the center actuator to thereby function as a common bias electrode, the lower thin film electrode of the side actuator being connected to the upper thin film electrode of the center actuator to thereby function as a signal electrode. When the electric field is applied in the thin film actuated mirror, the side actuator expands and the center actuator contracts upward, allowing the thin film actuated mirror to tilt an increased angle. Each of the thin film mirrors is cantilevered at a distal end of the center actuator in each of the actuating structures.

8 Claims, 18 Drawing Sheets

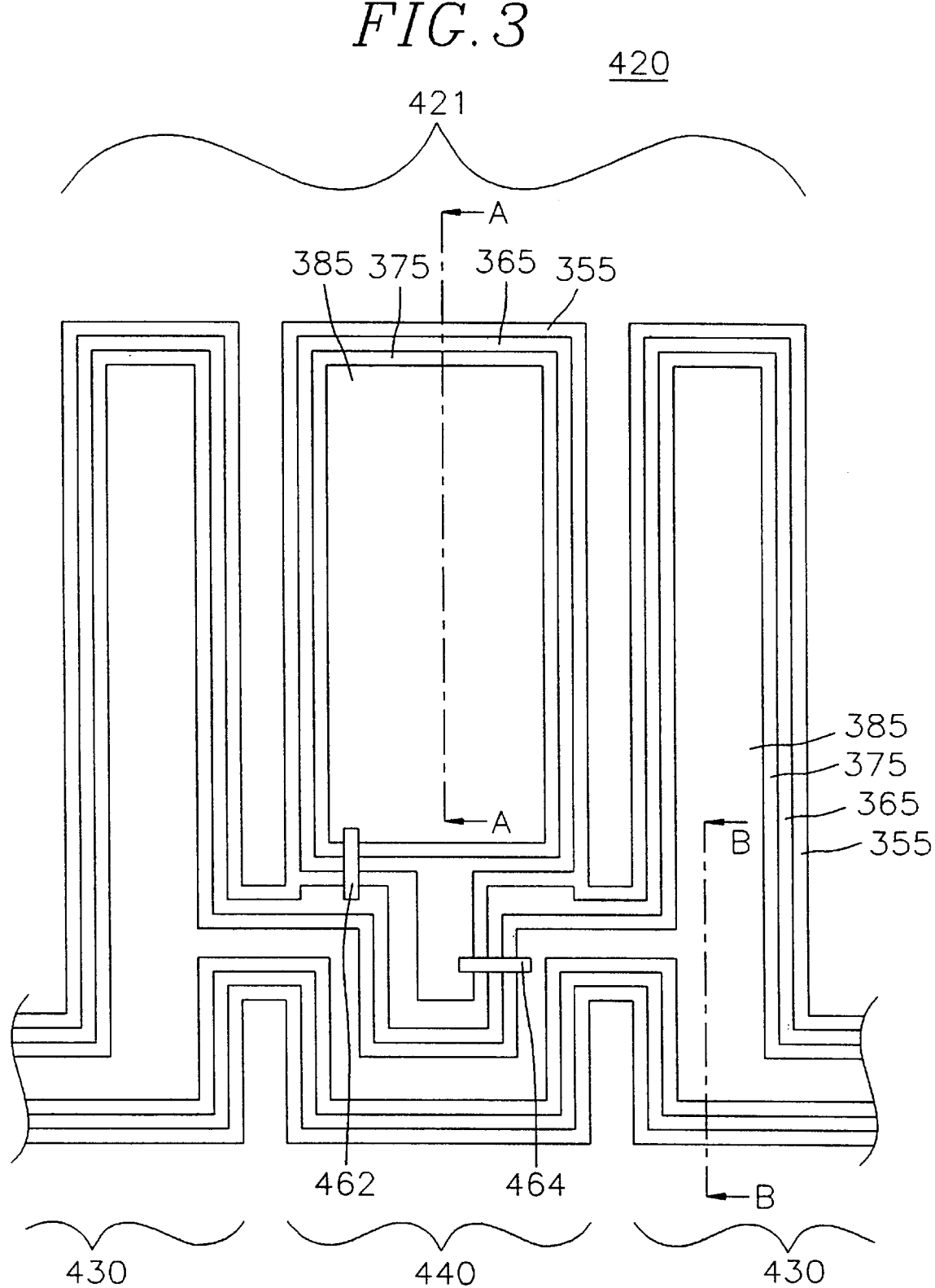

ACTUATED MIRROR HAVING AN INCREASED TILTING ANGLE

FIELD OF THE INVENTION

The present invention relates to an optical projection system; and, more particularly, to an array of M×N thin film actuated mirrors for use in the system and a method for the manufacture thereof, each of the actuated mirrors having an increased tilting angle.

BACKGROUND OF THE INVENTION

Among the various video display systems available in the art, an optical projection system is known to be capable of providing high quality displays in a large scale. In such an optical projection system, light from a lamp is uniformly illuminated onto an array of, e.g., M×N, actuated mirrors, wherein each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of, e.g., an optical baffle. By applying an electric signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIGS. 1 and 2A to 2L, there are illustrated a cross sectional view of an array 100 of M×N thin film actuated mirrors and cross section views setting forth manufacturing steps therefor, wherein M and N are integers, disclosed in a copending commonly owned application U.S. Ser. No. 08/602,928, entitled "THIN FILM ACTUATED MIRROR ARRAY FOR USE IN AN OPTICAL PROJECTION SYSTEM".

The array 100 of M×N thin film actuated mirrors 101 includes an active matrix 110, a passivation layer 120, an etchant stopping layer 130 and an array of M×N actuating structures 250, as shown in FIG. 1.

The active matrix 110 includes a substrate 112, an array of M×N transistors (not shown) and an array of M×N connecting terminals 114.

The passivation layer 120, made of, e.g., a phosphorsilicate glass (PSG) or silicon nitride, and having a thickness of 0.1–2 µm, is located on top of the active matrix 110.

The etchant stopping layer 130, made of silicon nitride, and having a thickness of 0.1–2 µm, is positioned on top of the passivation layer 120.

Each of the actuating structures 250 has a distal and a proximal ends, and is provided with a first thin film electrode 185, a thin film electrodisplacive member 175, a second thin film electrode 165, an elastic member 155 and a conduit 195. The first thin film electrode 185 made of an electrically conducting and light reflecting material is located on top of the thin film electrodisplacive member 175, and is divided into an actuating and a light reflecting portions 220, 230 by a horizontal stripe 187, wherein the horizontal stripe 187 disconnects electrically the actuating and the light reflecting portions 220, 230. The actuating portion 220 thereof is electrically connected to ground, thereby functioning as a mirror as well as a common bias electrode. The light reflecting portion 230 thereof functions as the mirror. The thin film electrodisplacive member 175 is placed on top of the second thin film electrode 165. The second thin film electrode 165 is located on top of the elastic member 155, and is electrically connected to a corresponding transistor through the conduit 195 and the connecting terminal 114 and is disconnected electrically from the second thin film electrode 165 in other thin film actuated mirrors 101, thereby allowing it to function as a signal electrode. The elastic member 155 is positioned below the second thin film electrode 165. A bottom portion at the proximal end thereof is attached to top of the active matrix 110, with the etchant stopping 130 and the passivation layers 120 partially intervening therebetween, thereby cantilevering the actuating structure 250.

In FIGS. 2A to 2L are provided with cross section views illustrating the method for manufacturing the array 100 of M×N thin film actuated mirrors 101 shown in FIG. 1.

The process for the manufacture of the array 100 begins with the preparation of an active matrix 110 including a substrate 112, an array of M×N connecting terminals 114 and an array of M×N transistors (not shown), as shown in FIG. 2A.

In a subsequent step, there is formed a passivation layer 120, made of, e.g., PSG or silicon nitride, and having a thickness of 0.1–2 µm, on top of the active matrix 110 by using, e.g., a CVD or a spin coating method.

Thereafter, an etchant stopping layer 130, made of silicon nitride, and having a thickness of 0.1–2 µm, is deposited on top of the passivation layer 120 by using, e.g., a sputtering or a CVD method, as shown in FIG. 2B.

Then, a thin film sacrificial layer 140 is formed on top of the etchant stopping layer 130 by using a sputtering, an evaporation, a CVD or spin coating method, as shown in FIG. 2C.

Subsequently, an array of M×N pairs of empty cavities 145 is created in the thin film sacrificial layer 140 in such a way that one of the empty cavities 145 in each pair encompasses one of the connecting terminals 114 by using a dry or an wet etching method, as shown in FIG. 2D.

In a next step, an elastic layer 150, made of a nitride, e.g., silicon nitride, and having a thickness of 0.1–2 µm, is deposited on top of the thin film sacrificial layer 140 including the empty cavities 145 by using a CVD method, as shown in FIG. 2E.

Thereafter, a second thin film layer (not shown), made of an electrically conducting material, e.g., Pt/Ta, and having a thickness of 0.1–2 µm, is formed on top of the elastic layer 150 by using a sputtering or a vacuum evaporation method. The second thin film layer is then iso-cut into an array of M×N second thin film electrodes 165 by using a dry etching method, wherein each of the second thin film electrodes 165 is electrically disconnected from other second thin film electrodes 165, as shown in FIG. 2F.

Then, a thin film electrodisplacive layer 170, made of a piezoelectric material, e.g., PZT, or an electrostrictive material, e.g., PMN, and having a thickness of 0.1–2 µm, is deposited on top of the array of M×N second thin film electrodes 165 by using an evaporation, a Sol-Gel, a sputtering or a CVD method, as shown in FIG. 2G.

Subsequently, a first thin film layer 180, made of an electrically conducting and light reflecting material, e.g., aluminum (Al) or silver (Ag), and having a thickness of 0.1–2 μm, is formed on top of the thin film electrodisplacive layer 170 by using a sputtering or a vacuum evaporation method, thereby forming a multiple layered structure 200, as shown in FIG. 2H.

In an ensuing step, as shown in FIG. 2I, the multiple layered structure 200 is patterned into an array 210 of M×N actuated mirror structures 211 by using a photolithography or a laser trimming method, until the thin film sacrificial layer 140 is exposed, each of the actuated mirror structures 211 including a first thin film electrode 185, a thin film electrodisplacive member 175, the second thin film electrode 165 and an elastic member 155. The first thin film electrode 185 is divided into an actuating and a light reflecting portions 220, 230 by a horizontal stripe 187, wherein the horizontal stripe 187 disconnects electrically the actuating and the light reflecting portions 220, 230 thereof, the actuating portion 220 thereof being electrically connected to ground.

In a subsequent step, an array of M×N holes 190 is created by using an etching method, wherein each of the holes 190 extends from top of the thin film electrodisplacive member 175 to top of the corresponding connecting terminal 114, as shown in FIG. 2J.

In a following step, a conduit 195 is formed by filling each of the holes 190 with a metal, e.g., tungsten (W), using, e.g., a lift-off method, thereby forming an array 240 of M×N semifinished actuated mirrors 241, as shown in FIG. 2K.

The preceeding step is then followed by completely covering each of the semifinished actuated mirrors 241 with a thin film protection layer (not shown).

The thin film sacrificial layer 140 is then removed by using an wet etching method using an etchant or a chemical, e.g., hydrogen fluoride (HF) vapor.

Finally, the thin film protection layer is removed to form the array 100 of M×N thin film actuated mirrors 101, as shown in FIG. 2L.

There are certain deficiencies associated with the array 100 of M×N thin film actuated mirrors 101. The first thin film electrode 185 of the thin film actuated mirror 101 functioning as a mirror is divided in the actuating portion 220 and the light reflecting portion 230 by the horizontal stripe 187, only the actuating portion 220 deforms in response to an electric field applied thereto, while the light reflecting portion 230 remains planar, resulting in the thin film actuated mirror 101 having a limited tilting angle.

Furthermore, the horizontal stripe 187 decrease the overall optical efficiency of the thin film actuated mirror 101.

SUMMARY OF THE INVENTION

It is, therefore, a primary object of the present invention to provide an array of M×N thin film actuated mirrors, each of the thin film actuated mirrors having an increased tilting angle.

It is another object of the present invention to provide a method for the manufacture of such an array of M×N thin film actuated mirrors.

In accordance with one aspect of the present invention, there is provided an array of M×N thin film actuated mirrors, wherein M and N are integers, for use in an optical projection system, the array comprising: an active matrix including a substrate and an array of M×N connecting terminals; an array of M×N actuating structures, each of the actuating structures being provided with a pair of side actuators and a center actuator, both ends of each of the side actuators being fixed to the active matrix, each of the actuators including an upper thin film electrode, a thin film electrodisplacive member, a lower thin film electrode and an elastic member, the thin film electrodisplacive member being located between the upper and lower thin film electrodes, the elastic member being located below the lower thin film electrode, one of the side actuators in each pair being further provided with a conduit, the lower thin film electrode of the side actuators being electrically disconnected from that of the center actuator, the upper thin film electrode of the side actuators being electrically disconnected from that of the center actuator, the lower thin film electrode in each of the side actuators in each of the actuating structures being electrically connected to each other, wherein the lower thin film electrode in each of the side actuators is electrically connected to the connecting terminal through the conduit and is electrically connected to the upper thin film electrode of the center actuator to thereby function as a signal electrode, and the upper thin film electrode in each of the side actuators is electrically connected to a ground and is electrically connected to the lower thin film electrode of the center actuator to thereby function as a common bias electrode; and an array of M×N thin film mirrors, each of the thin film mirrors being located above each of the actuating structures, and each of thin film mirrors being cantilevered at the distal end of the center actuator in each of the actuating structures.

In accordance with another aspect of the present invention, there is provided a method for manufacturing an array of M×N thin film actuated mirrors, wherein M and N are integers, for use in an optical projection system, the method comprising the steps of: providing an active matrix including a substrate and an array of M×N connecting terminals; depositing a thin film sacrificial layer on top of the active matrix; creating an array of M×N pairs of empty cavities in the thin film sacrificial layer in such a way that one of the empty cavities in each pair encompasses one of the connecting terminals; depositing an elastic layer on top of the thin film sacrificial layer including the empty cavities; forming an array of M×N conduits from top of the elastic layer to top of each of the connecting terminals; depositing a lower thin film layer, a thin film electrodisplacive layer and a upper thin film layer on top of the elastic layer including the conduits to thereby form a multiple layered structures; patterning the multiple layered structure into an array of actuator structures, each of the actuator structures being provided with a pair of side actuators and a center actuator; dicing an array of actuator structures into an array of M×N actuating structures, until the thin film sacrificial layer is exposed, in such a way that each of the actuating structures including an upper thin film electrode, a thin film electrodisplacive member, a lower thin film electrode and an elastic member, each of the side actuators in the actuating structure further including one of the conduits, the lower thin film electrode in each of the side actuators being electrically connected to the corresponding connecting terminal; forming electrical connections between the upper thin film electrode in the center actuator and the lower thin film electrode in the side actuator and between the upper thin film electrode in the side actuator and the lower thin film electrode in the center actuator, respectively; removing the thin film sacrificial layer; and forming an array of M×N thin film mirrors on top of the each of actuating structures to thereby form the array of M×N thin film actuated mirrors.

BRIEF DESCRIPTION OF THE DRAWINGS

The above and other objects and features of the present invention will become apparent from the following description of the preferred embodiments given in conjunction with the accompanying drawings, wherein:

FIG. 3 is a top view of an actuating structures in accordance with the present invention;

DETAILED DESCRIPTION OF THE PREFERRED EMBODIMENTS

Figure 1:
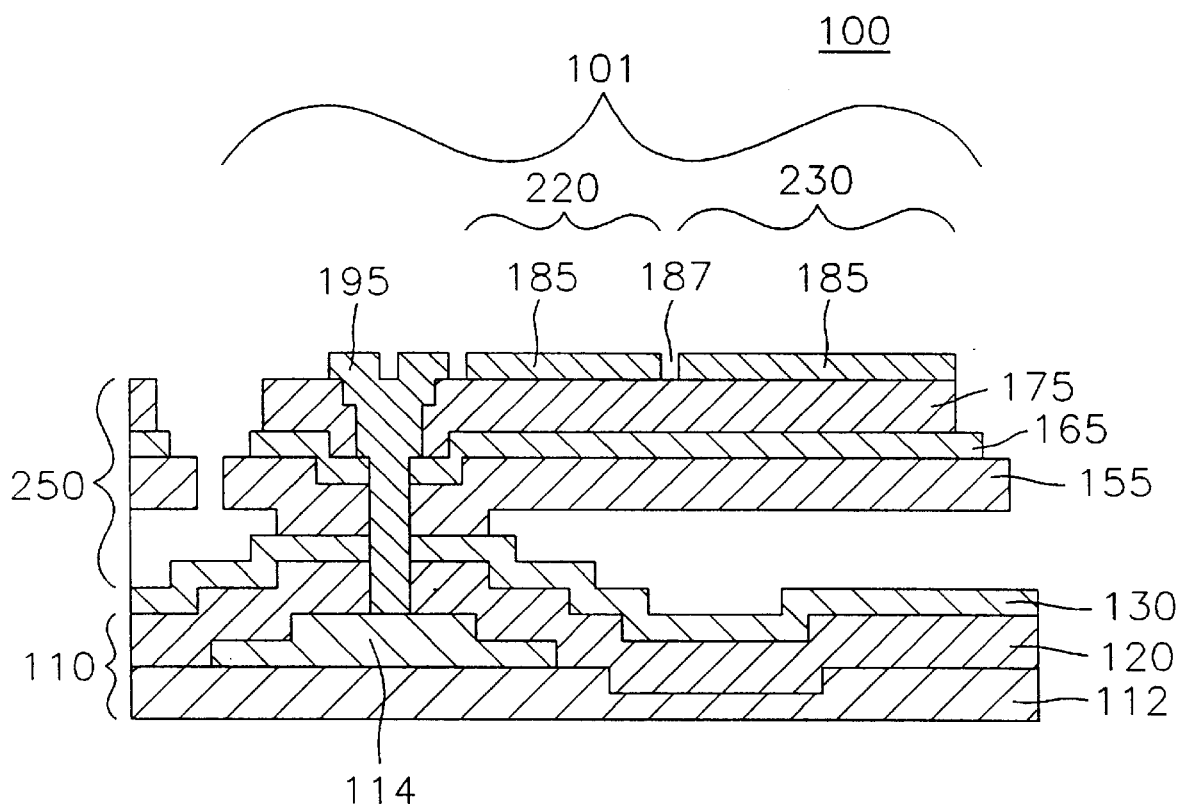
FIG. 1 is a cross section view setting forth an array of M×N thin film actuated mirrors previously disclosed.
Figure 2A:
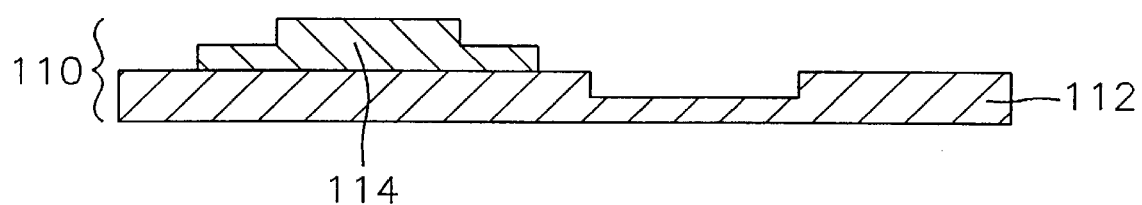
FIGS. 2A to 2L are schematic cross sectional views illustrating a method for the manufacture of an array of M×N thin film actuated mirrors previously disclosed.
Figure 2B:
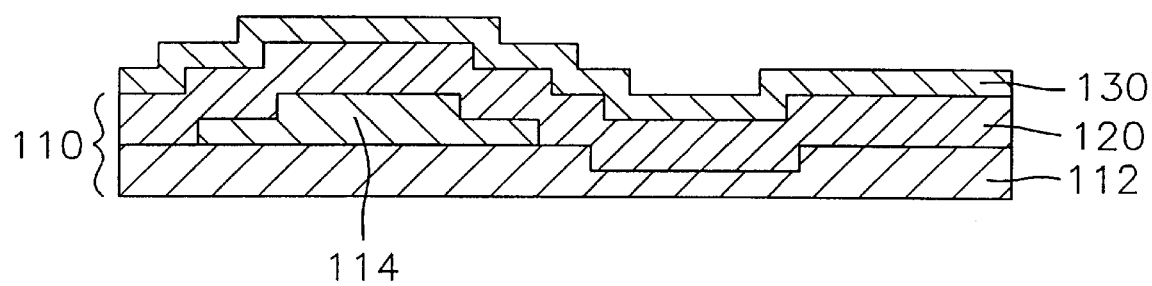
Figure 2C:
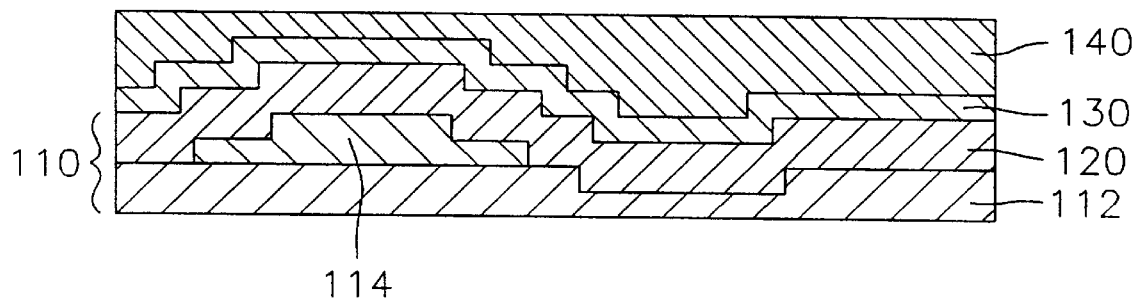
Figure 2D:
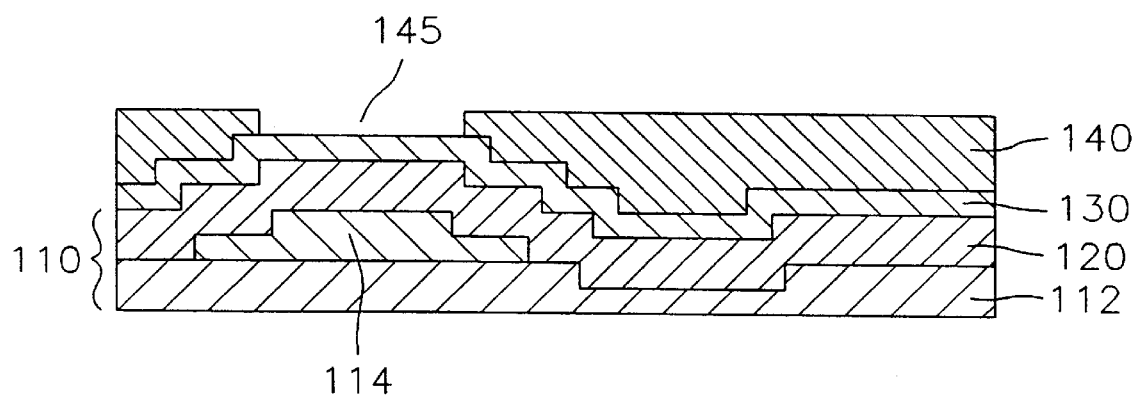
Figure 2E:
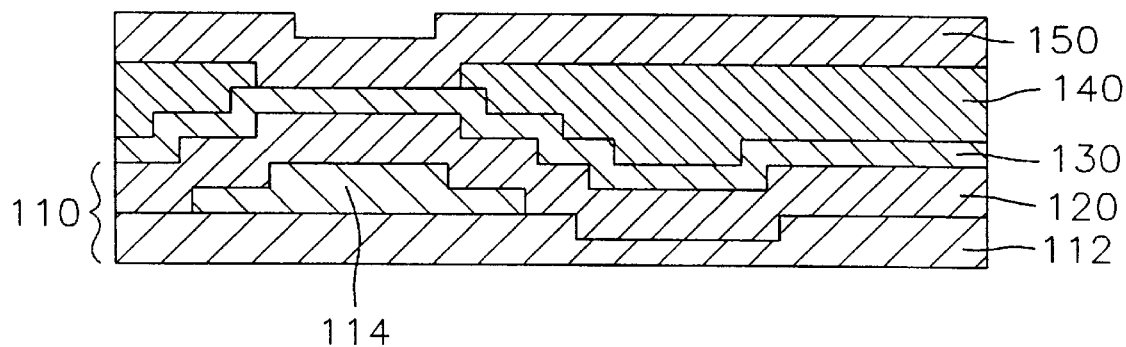
Figure 2F:
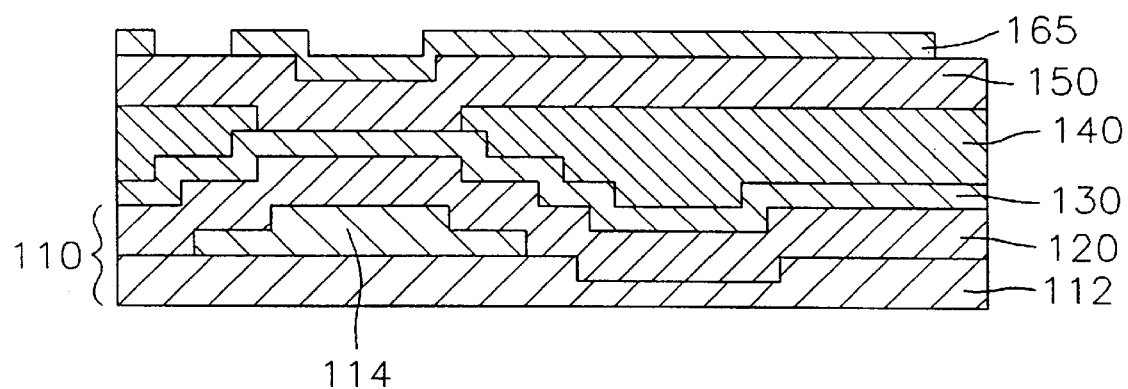
Figure 2G:
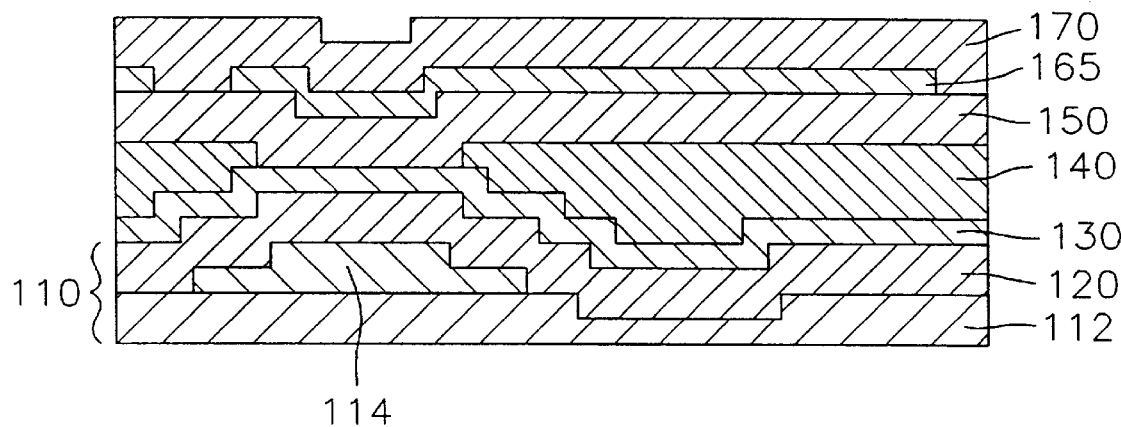
Figure 2H:
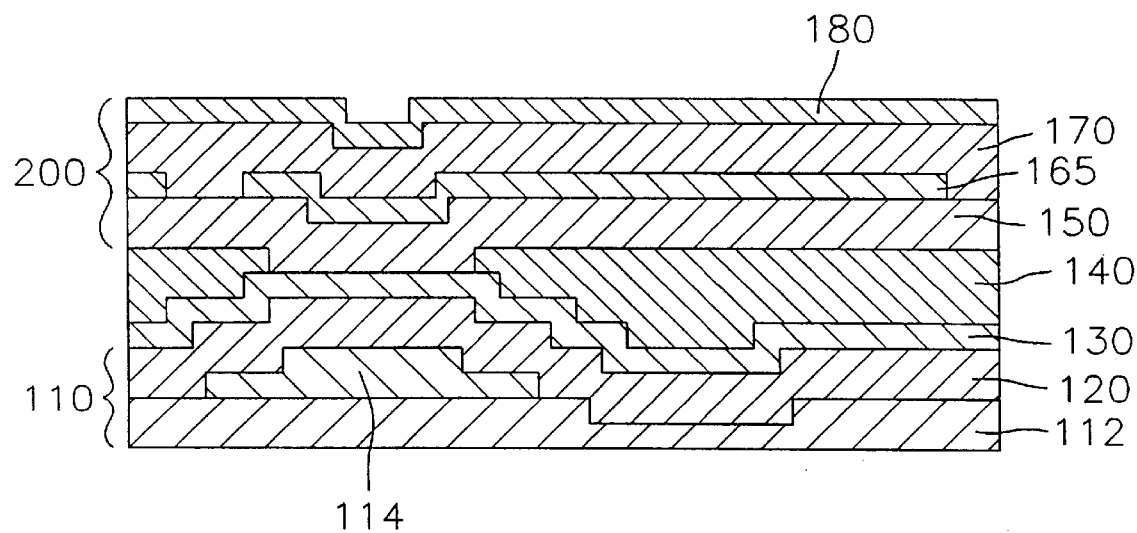
Figure 2I:
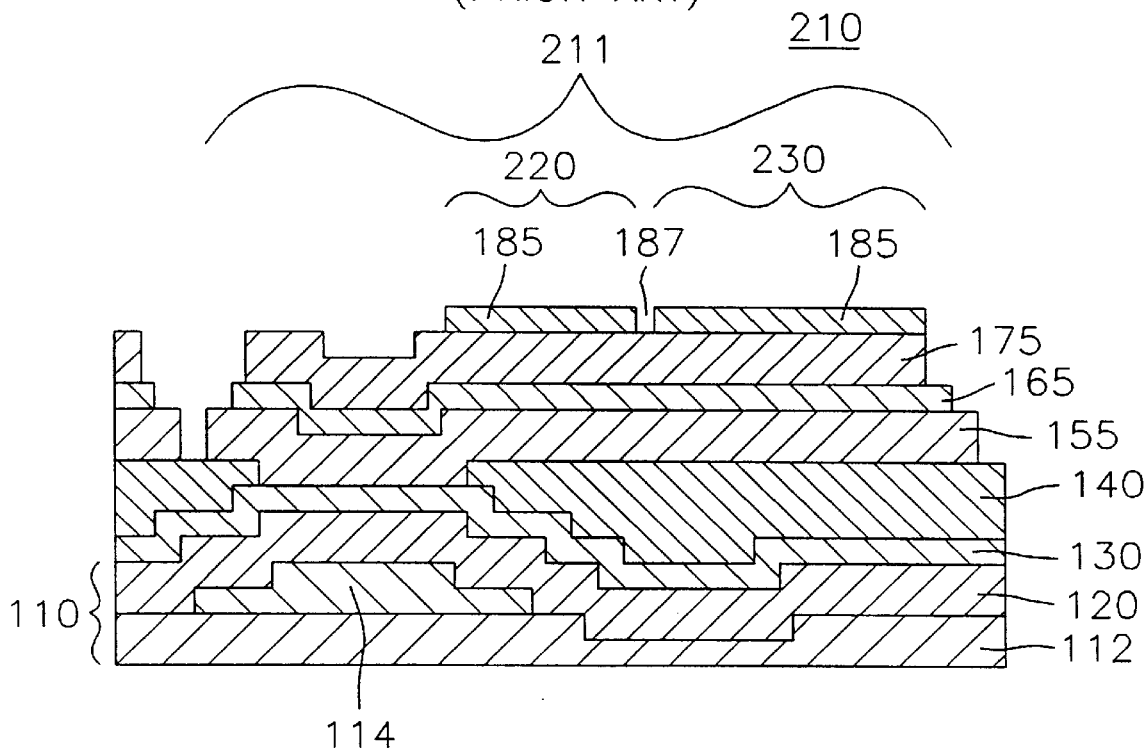
Figure 2J:
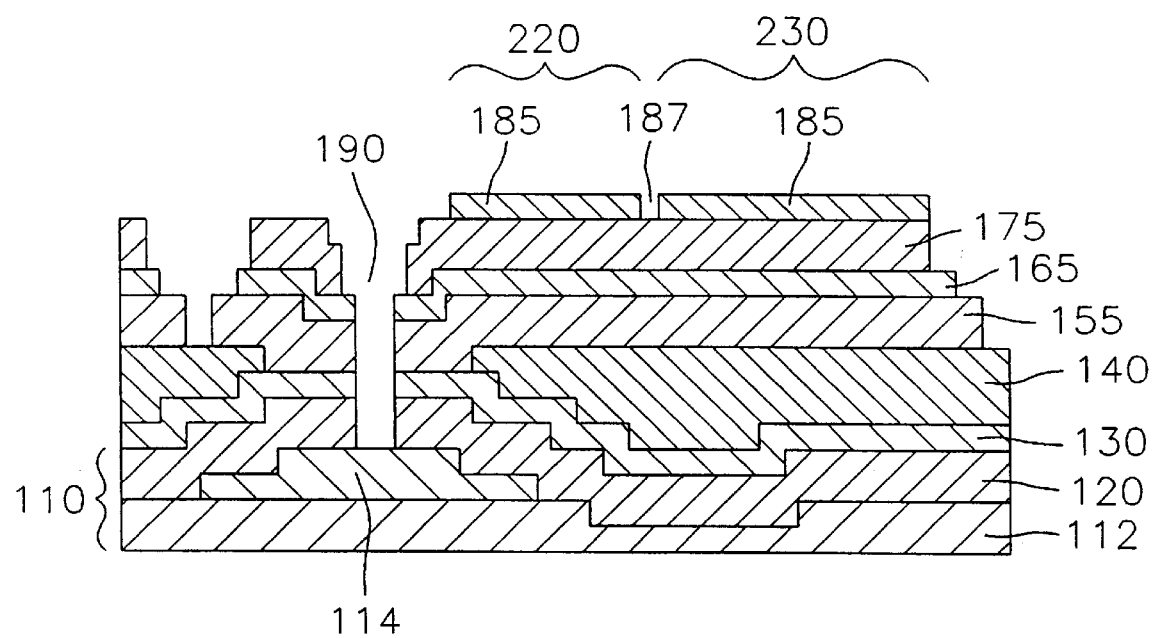
Figure 2K:
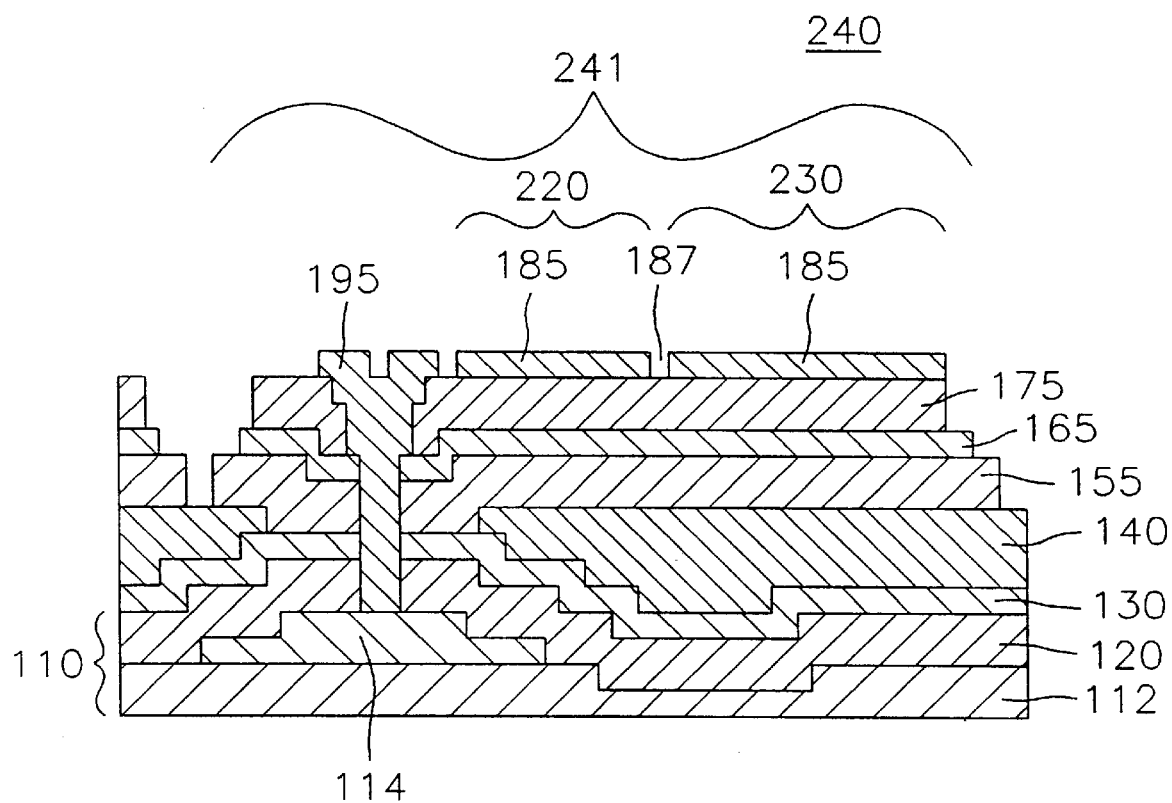
Figure 2L:
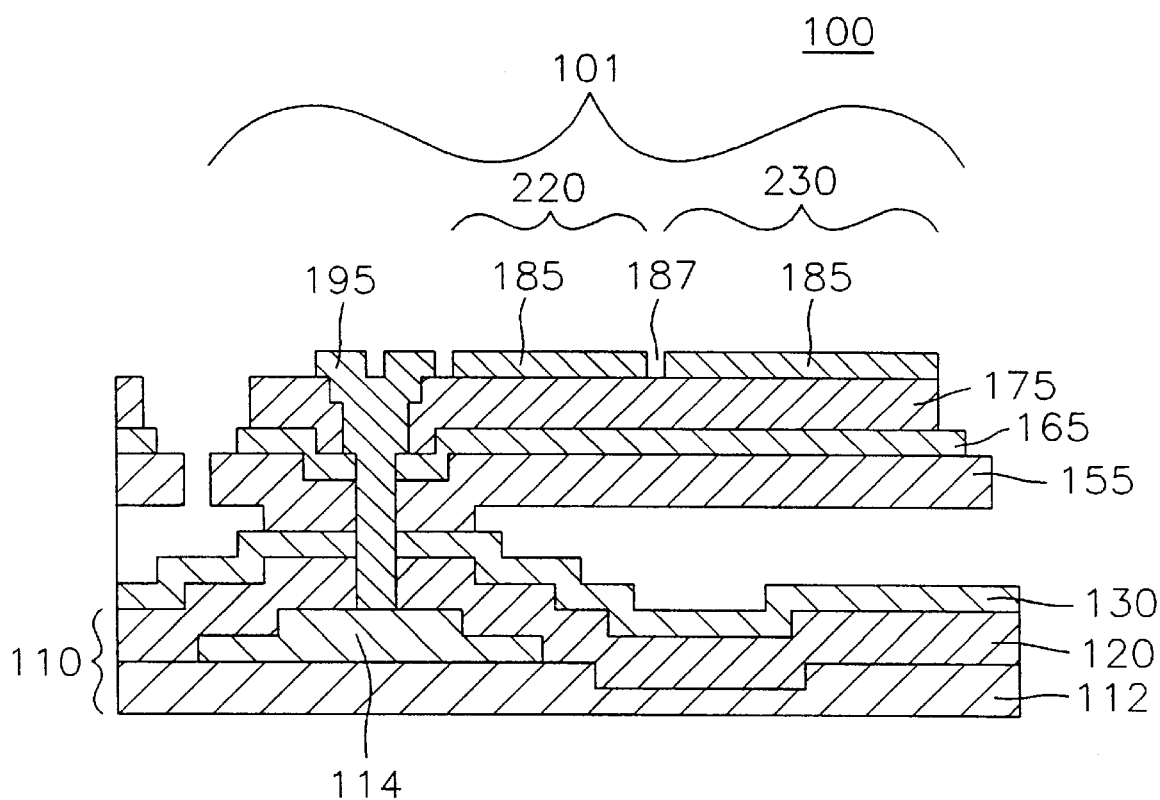

There are provided in FIGS. 3, 4A, 4B, 4C and 5A to 5M a top view depicting an array 420 of M×N actuating structures 421, a schematic cross sectional view taken along lines A—A and B—B in FIG. 3 setting forth an array 300 of M×N thin film actuated mirrors 301, wherein M and N are integers, for use in an optical projection system, a cross sectional view presenting one of side actuator 430 of the actuated mirror 301, a cross sectional view providing a center actuator 440 of the actuated mirror 301 and schematic cross sectional views illustrating a method for manufacturing the array 300 of M×N thin film actuated mirrors 301, in accordance with the present invention, respectively. It should be noted that like parts appearing in FIGS. 3, 4A, 4B, 4C and 5A to 5M are represented by like reference numerals.

Figure 4A:
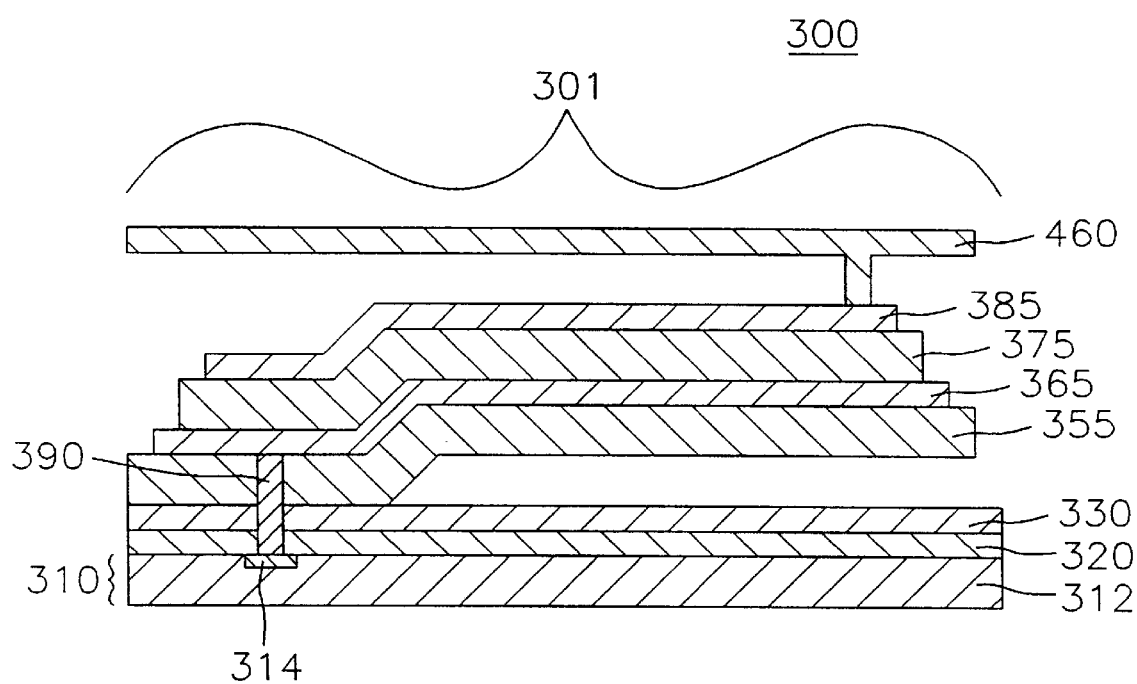
FIGS. 4A, 4B and 4C are a schematic cross sectional view of an actuated mirror in the array taken along lines A—A and B—B in FIG. 3, a cross sectional view presenting one of the side actuators of the actuated mirror and a cross sectional view of a center actuator of the actuated mirror, respectively, in accordance with the present invention.

As shown in FIG. 4A, the array 300 includes an active matrix 310, a passivation layer 320, an etchant stopping layer 330, an array 420 of M×N actuating structures 421 and an array of M×N thin film mirrors 460.

The active matrix 310 includes a substrate 312, an array of M×N transistors (not shown) and an array of M×N connecting terminals 314. Each of the connecting terminals 314 is electrically connected to a corresponding transistor in the array of transistors.

The passivation layer 320, made of, e.g., a phosphorsilicate glass (PSG) or silicon nitride, and having a thickness of 0.1–2 $\mu$m, is located on top of the active matrix 310.

The etchant stopping layer 330, made of silicon nitride, and having a thickness of 0.1–2 $\mu$m, is positioned on top of the passivation layer 320.

Figure 4B:
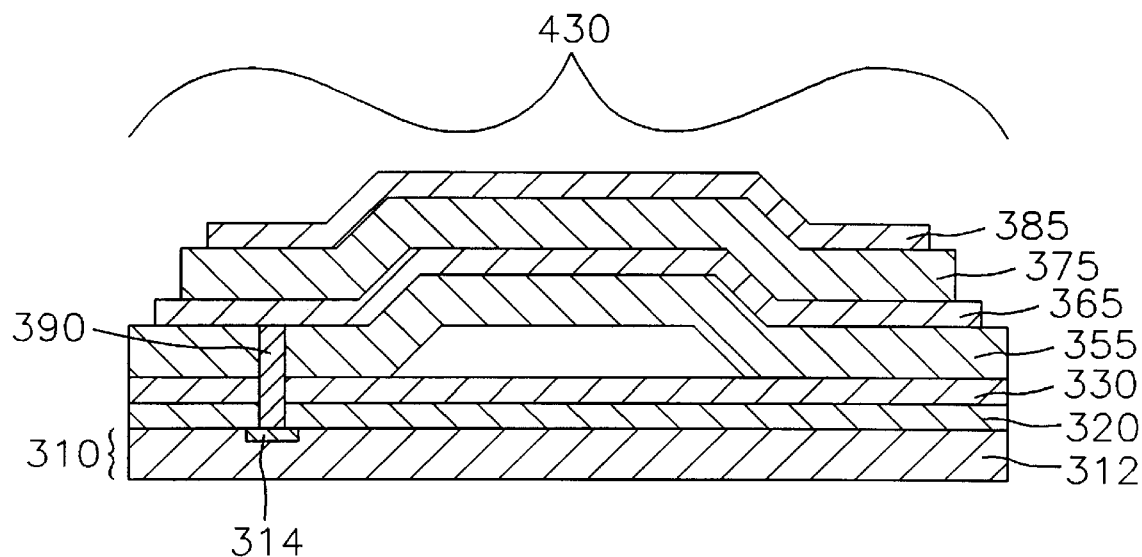
Figure 4C:
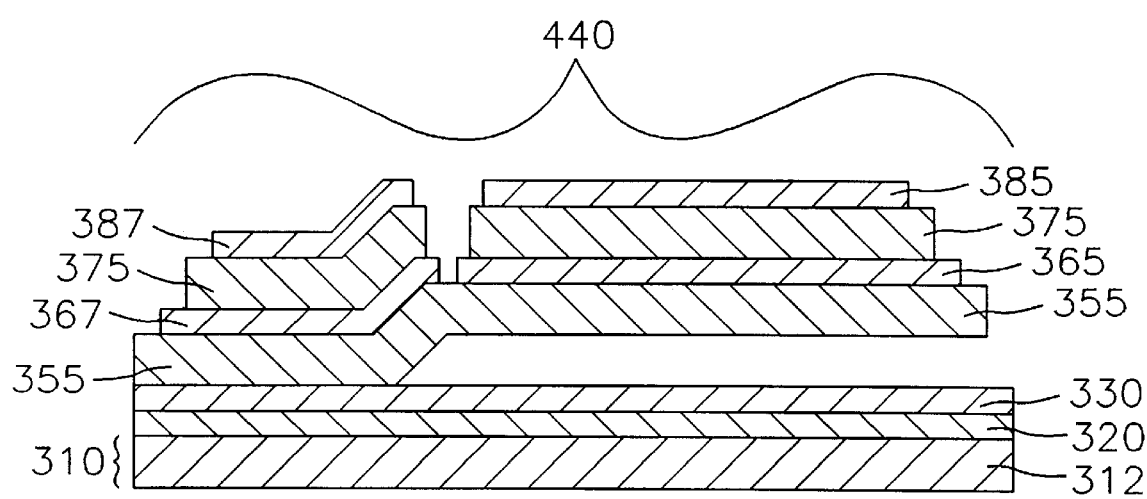

Each of the actuating structure 421, as shown in FIGS. 3 and 4A, is provided with a pair of side actuators 430 and a center actuator 440. Each of the actuators 430, 440 includes an upper thin film electrode 385, a thin film electrodisplacive member 375, a lower thin film electrode 365 and an elastic member 355, wherein one of the side actuators further includes a conduit. The thin film electrodisplacive member 375 is located between the upper and lower thin film electrode 385, 365 and the elastic member is positioned below the lower thin film electrode 365. The lower thin film electrodes 365 of the side actuators 430 are electrically disconnected from that of the center actuator 440, the upper thin film electrode 385 of the side actuators 430 are electrically disconnected from that of the center actuator 440 and the lower thin film electrodes 365 in the side actuators 430 in each of the actuating structures 421 are electrically connected to each other. Each of the actuating structures 421 includes a pair of electrical connections 462, 464. The upper thin film electrode 385 of the side actuators 430 is electrically connected to the lower thin film electrode 365 of the center actuator 440 through one of the electrical connections 464, to thereby function as a common bias electrode, and the lower thin film electrode 365 of the side actuator 430 electrically connected to a connecting terminal 314 through the conduit 390 is electrically connected to the upper thin film electrode 387 of the center actuator 440 through the other connection 462 to thereby function as a signal electrode. Both ends of the side actuators 430 of each of the actuating structure 421, as shown in FIG. 4B, are fixed to the active matrix 310 and the center actuator 440 of each of the actuating structure 421, as shown in FIG. 4C, is provided with a proximal end and a distal end.

Each of the thin film mirrors 465 made of a light reflecting material, e.g., Al, is cantilevered at the distal end of the center actuator 440 in each of the actuating structure 421.

In FIGS. 5A to 5M, there are provided schematic cross sectional views illustrating a method for the manufacture of the array 300 of M×N thin film actuated mirrors 301 shown in FIG. 3A.

The process for the manufacture of the array 300 begins with the preparation of an active matrix 310 including a substrate 312, an array of M×N connecting terminals 314 and an array of M×N transistors (not shown).

In a subsequent step, there is formed a passivation layer 320, made of, e.g., PSG or silicon nitride, and having a thickness of 0.1–2 $\mu$m, on top of the active matrix 310 by using, e.g., a CVD or a spin coating method.

Figure 5A:
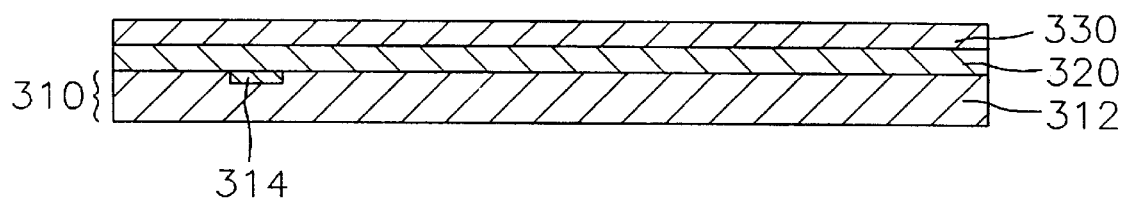
FIGS. 5A to 5M are schematic cross sectional views setting forth a method for manufacturing the array of M×N thin film actuated mirrors taken along line A—A in FIG. 3 in accordance with the present invention.

Thereafter, an etchant stopping layer 330, made of silicon nitride, and having a thickness of 0.1–2 $\mu$m, is deposited on top of the passivation layer 320 by using, e.g., a sputtering or a CVD method, as shown in FIG. 5A.

Figure 5B:
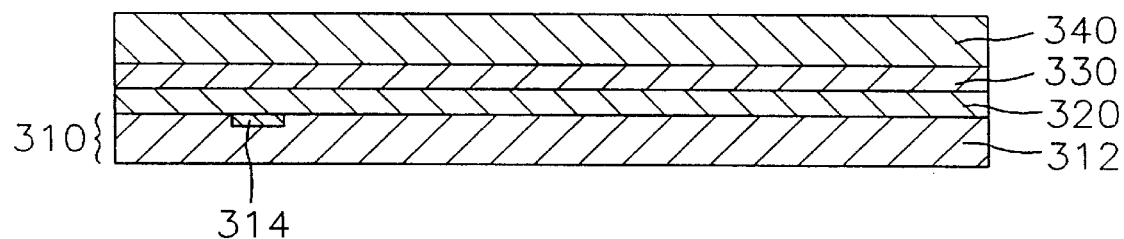

Then, a thin film sacrificial layer 340 is formed on top of the etchant stopping layer 330. The thin film sacrificial layer 340 is formed by using a sputtering or an evaporation method if the thin film sacrificial layer 340 is made of a metal, a CVD or a spin coating method if the thin film sacrificial layer 340 is made of a PSG, or a CVD method if the thin film sacrificial layer 340 is made of a poly-Si, as shown in FIG. 5B.

Figure 5C:
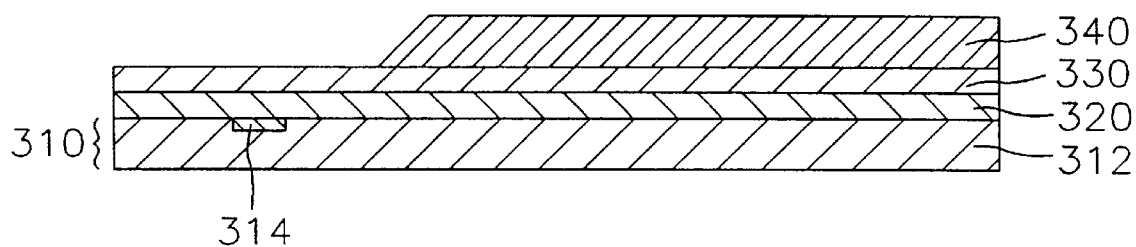

Subsequently, an array of M×N pairs of empty cavities 345 is created in the thin film sacrificial layer 340 in such a way that one of the empty cavities 345 encompasses one of the connecting terminals 314 by using a dry or an wet etching method, as shown in FIG. 5C.

Figure 5D:
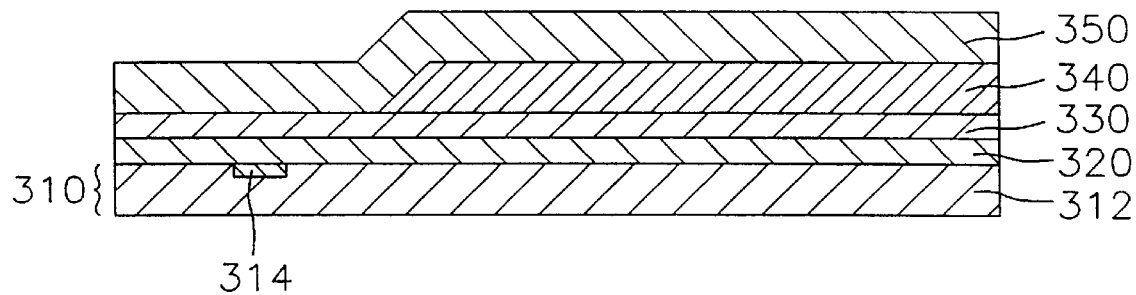

In a next step, an elastic layer 350, made of a nitride, e.g., silicon nitride, and having a thickness of 0.1–2 $\mu$m, is deposited on top of the thin film sacrificial layer 340 including the empty cavities 345 by using a CVD method, as shown in FIG. 5D.

Figure 5E:
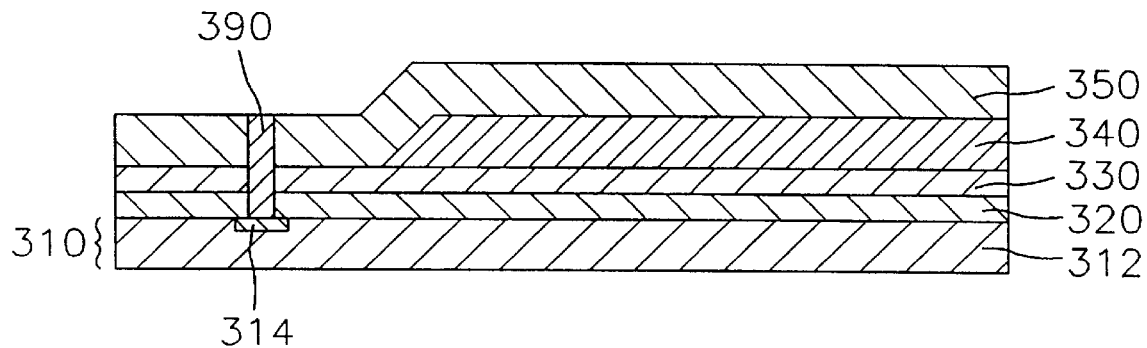

In a subsequent step, an array of M×N conduits 390 made of a metal, e.g., formed from top of the elastic layer 350 to top of the connecting terminal 314, as shown in FIG. 5E.

Figure 5F:
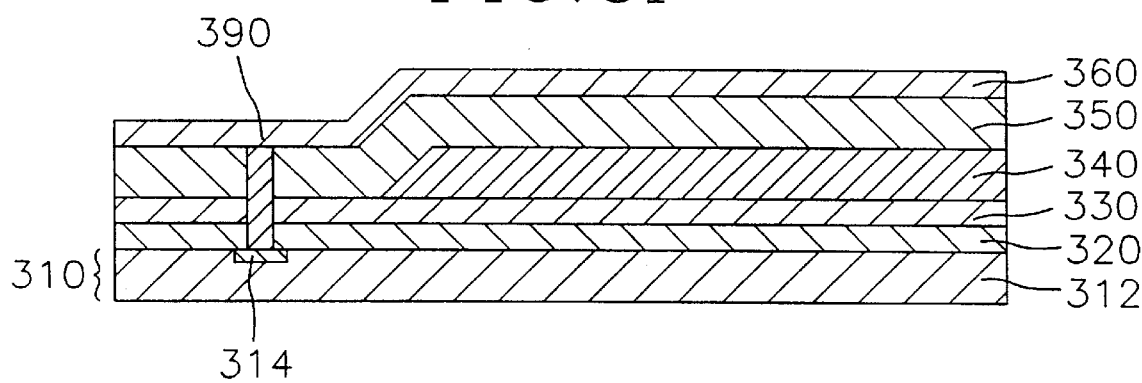

Thereafter, a lower thin film layer 360, made of an electrically conducting material, e.g., Pt/Ta, and having a thickness of 0.1–2 $\mu$m, is formed on top of the elastic layer 350 by using a sputtering or a vacuum evaporation method, as shown in FIG. 5F.

Then, a thin film electrodisplacive layer 370, made of a piezoelectric material, e.g., PZT, or an electrostrictive material, e.g., PMN, and having a thickness of 0.1–2 µm, is deposited on top of the lower thin film electrodes 360 by using an evaporation, a Sol-Gel, a sputtering or a CVD method.

Figure 5G:
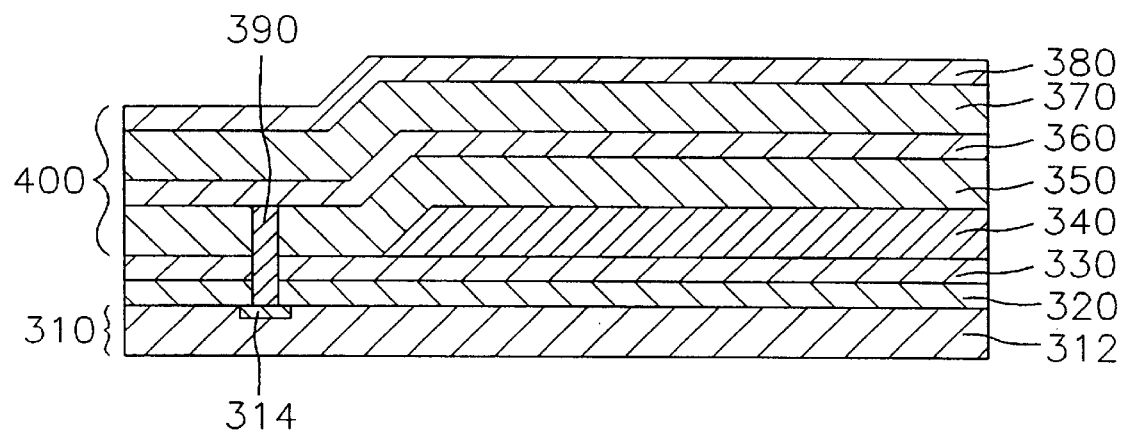

Subsequently, a upper thin film layer 380, made of an electrically conducting, e.g., aluminum (Al) or silver (Ag), and having a thickness of 0.1–2 µm, is formed on top of the thin film electrodisplacive layer 370 by using a sputtering or a vacuum evaporation method, thereby forming a multiple layered structure 400, as shown in FIG. 5G.

Thereafter, the multiple layered structure 400 is patterned into an array of actuator structures (not shown) by using a photolithography or a laser trimming method, each of the actuator structures being provided with a pair of side actuators (not shown) and a center actuator (not shown).

Figure 5H:
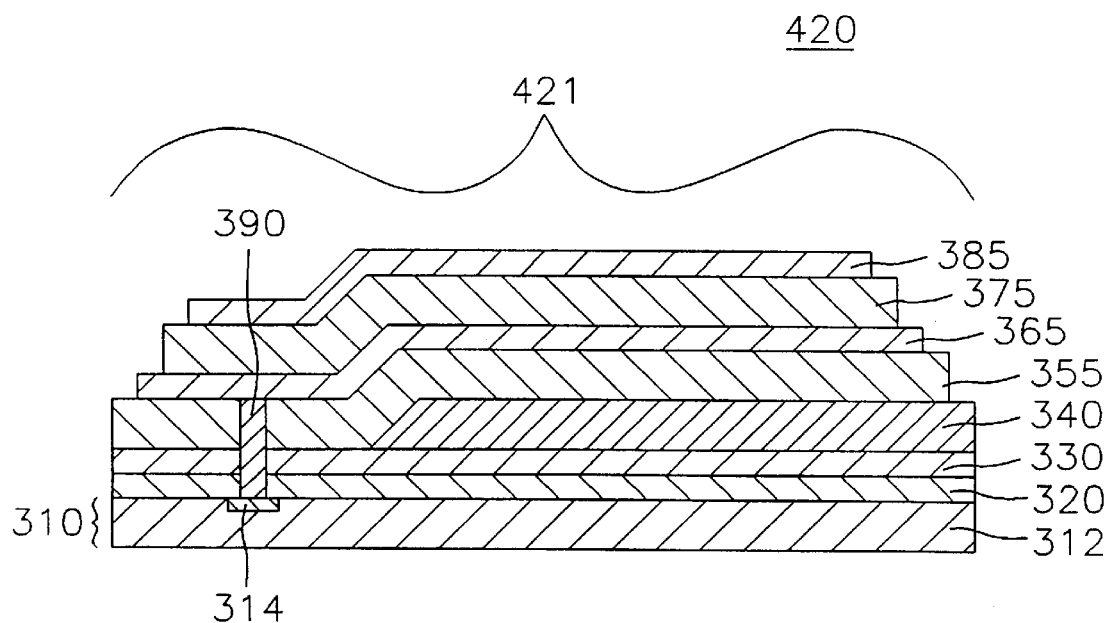

In an ensuing step, the array of actuator structures is diced into an array 420 of M×N actuating structures 421 by using a photolithography or a laser trimming method, until the thin film sacrificial layer 340 is exposed, in such a way that each of actuating structures 421 includes an upper thin film electrode 385, a thin film electrodisplacive member 375, an lower thin film electrode 365 and an elastic member 355, as shown in FIG. 5H.

In a next step, a pair of electrical connections (not shown) is formed on the actuating structure 421, one connecting electrically between the upper thin film electrode 385 of the side actuator with the lower thin film electrode 365 of the center actuator and the other connecting electrically between the lower thin film electrode 365 of the side actuator with the upper thin film electrode 385 of the center actuator.

Figure 5I:
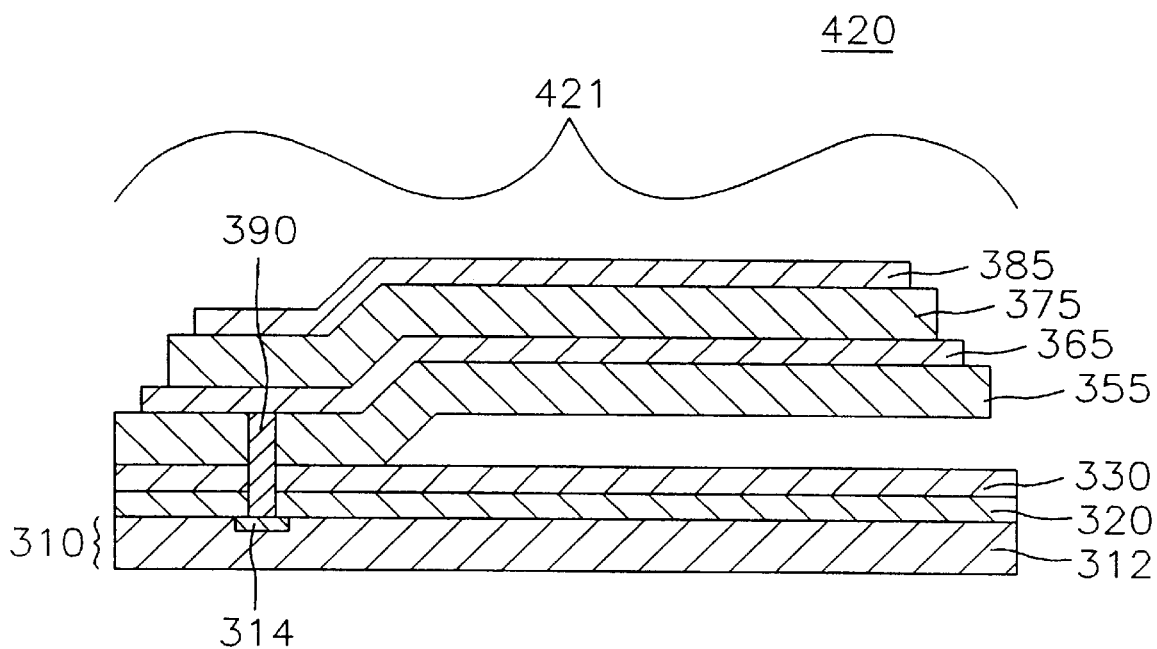

In a subsequent step, the thin film sacrificial layer 340 is then removed by using an etchant or chemical, e.g., hydrogen fluoride (HF) vapor, as shown in FIG. 5I.

Figure 5J:
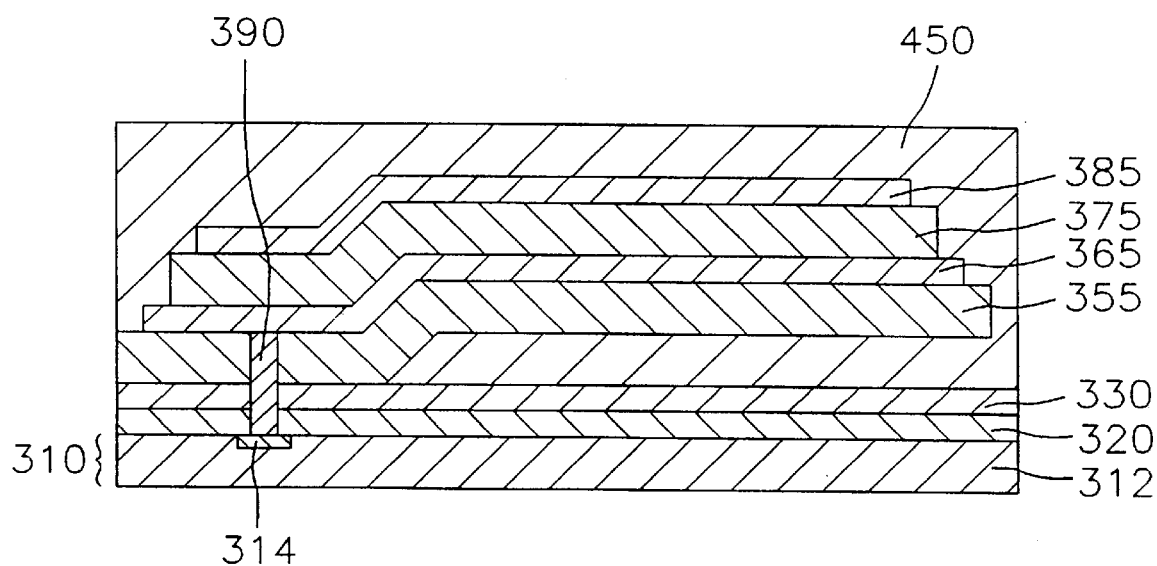

Next, a sacrificial material 450 is formed on the array 420 of M×N actuating structures 421 including the spaces formed when the thin film sacrificial layer 340 was removed, the sacrificial material 450 having a flat top surface, as shown in FIG. 5J.

Figure 5K:
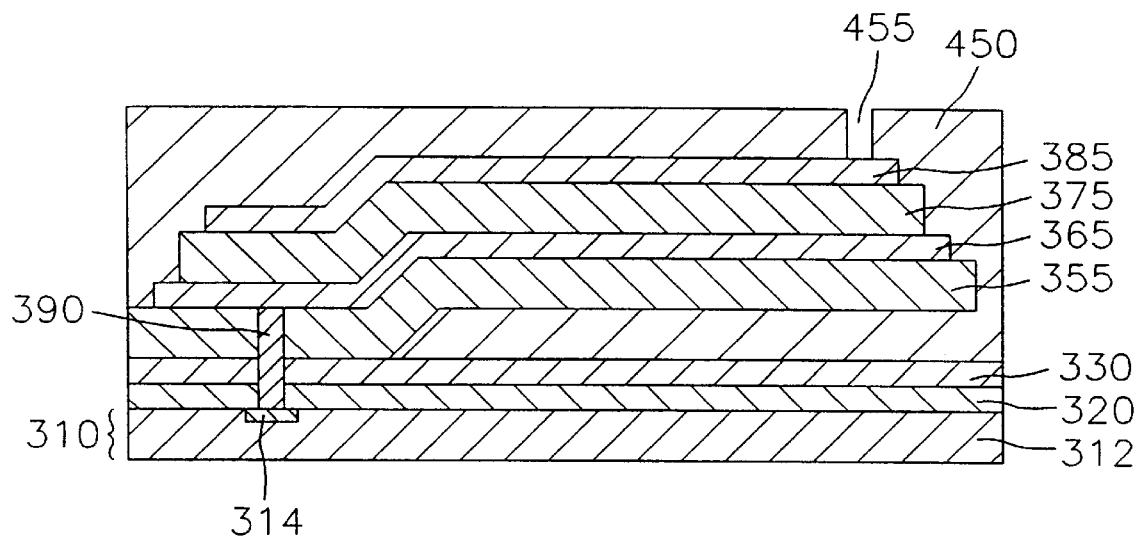

Thereafter, an array of M×N empty slots 455 is created in the sacrificial material 450 by using a photolithography method, as shown in FIG. 5K.

Figure 5L:
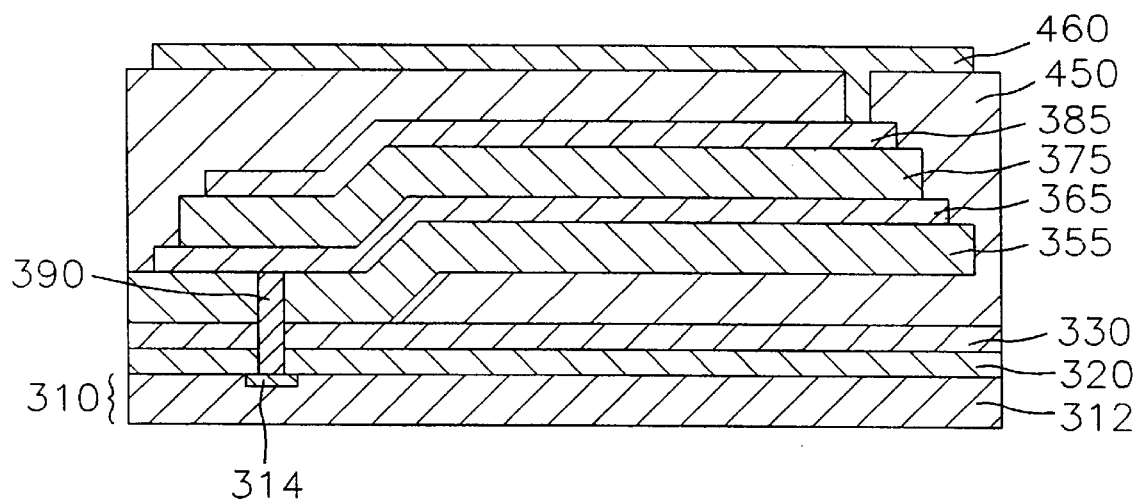

Subsequently, an thin film mirror layer (not shown) made of a light reflecting material, e.g., Al, is formed on top of the sacrificial material 450 including the empty slots 455. The thin film mirror is then patterned into an array of M×N thin film mirrors 465, as shown in FIG. 5L.

Figure 5M:
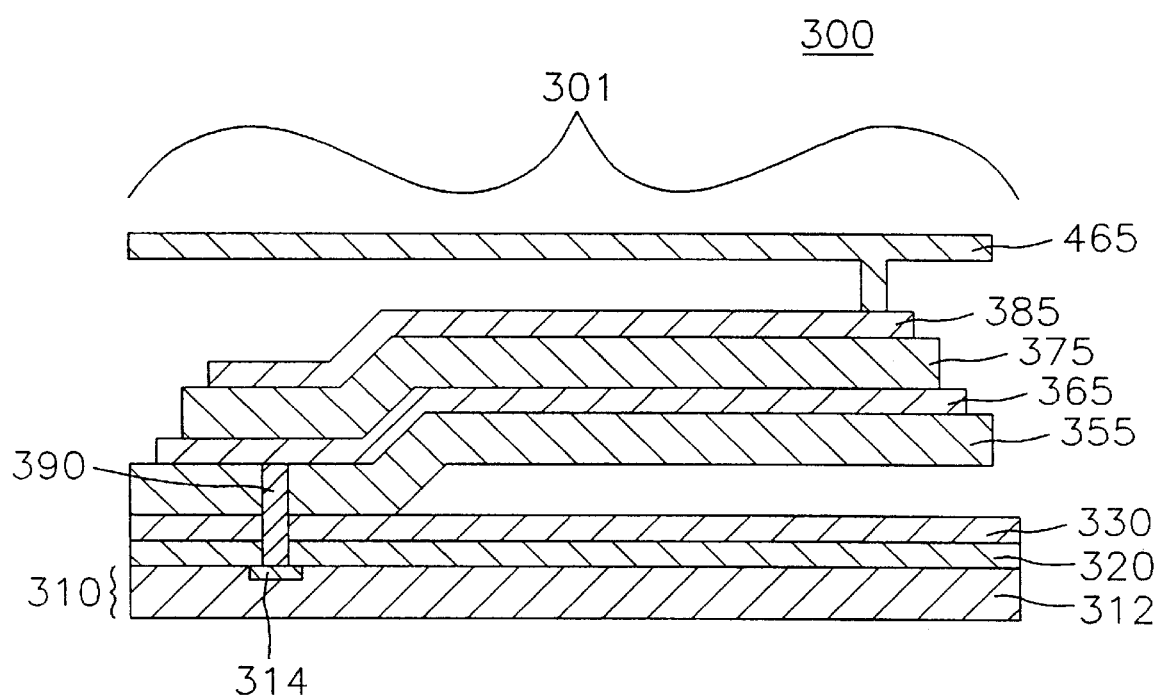

Finally, the sacrificial material 450 is removed by using an etching method, as shown in FIG. 5M, thereby forming an array 300 of M×N thin film actuated mirrors 301.

In the inventive array 300 of M×N thin film actuated mirrors 301 and method for the manufacture thereof, the actuating structure 421 is provided with a pair of side actuators 430 and the center actuator 440, both ends of the side actuators 430 being fixed to the active matrix 310, the upper thin film electrode 385 of the side actuator 430 being electrically connected to the lower thin film electrode 365 of the center actuator 440 thereby functioning as a common bias electrode, the lower thin film electrode 365 of the side actuator 430 being electrically connected to the upper thin film electrode 385 of the center actuator 440 thereby functioning as a signal electrode. When an electric field is applied in the thin film actuated mirror 301, the side actuator 430 expands and the center actuator 440 contracts upward, allowing the thin film actuated mirror 301 to tilt at an increased angle.

Furthermore, each of the thin film mirrors 460 stays planar when the thin film actuated mirrors deforms in response to the electric field applied thereto thereby increasing optical efficiency of the actuated mirror 301.

While the present invention has been described with respect to certain preferred embodiments only, other modifications and variations may be made without departing from the scope of the present invention as set forth in the following claims.

What is claimed is:

1. An array of M×N thin film actuated mirrors, wherein M and N are integers, for use in an optical projection system, the array comprising:

an active matrix including a substrate and an array of M×N connecting terminals;

an array of M×N actuating structures, each of the actuating structures being provided with a pair of side actuators and a center actuator, both ends of each of the side actuators being fixed to the active matrix, each of the actuators including an upper thin film electrode, a thin film electrodisplacive member, a lower thin film electrode and an elastic member, the thin film electrodisplacive member being located between the upper and lower thin film electrodes, the elastic member being located below the lower thin film electrode, the lower thin film electrode of the side actuators being electrically disconnected from that of the center actuator, wherein the lower thin film electrode in each of the side actuators is electrically connected to the connecting terminal through the conduit and is electrically connected to the upper thin film electrode of the center actuator to thereby function as a signal electrode, and the upper thin film electrode in each of the side actuators is electrically connected to a ground and is electrically connected to the lower thin film electrode of the center actuator to thereby function as a common bias electrode; and an array of M×N thin film mirrors, each of the thin film mirrors being located above each of the actuating structures, and each of thin film mirrors being cantilevered at the distal end of the center actuator in each of the actuating structures.

2. The array of claim 1, wherein the active matrix further includes a passivation layer and an etchant stopping layer.

3. The array of claim 1, wherein each of the thin film mirrors is made of an aluminum (Al).

4. The array of claim 1, wherein one of the side actuators in each pair is further provided with a conduit.

5. The array of claim 1, wherein the lower thin film electrode in each of the side actuators in each of the actuating structures is electrically connected to each other.

6. A method for manufacturing an array of M×N thin film actuated mirrors, wherein M and N are integers, for use in an optical projection system, the method comprising the steps of:

providing an active matrix including a substrate and an array of M×N connecting terminals;

depositing a thin film sacrificial layer on top of the active matrix;

creating an array of M×N pairs of empty cavities in the thin film sacrificial layer in such a way that one of the empty cavities in each pair encompasses one of the connecting terminals;

depositing an elastic layer on top of the thin film sacrificial layer including the empty cavities;

forming an array of M×N conduits from top of the elastic layer to top of each of the connecting terminals;

depositing a lower thin film layer, a thin film electrodisplacive layer and a upper thin film layer on top of the elastic layer including the conduits to thereby form a multiple layered structures;

patterning the multiple layered structure into an array of actuator structures, each of the actuator structures being provided with a pair of side actuators and a center actuator;

dicing an array of actuator structures into an array of M×N actuating structures, until the thin film sacrificial layer is exposed, in such a way that each of the actuating structures including an upper thin film electrode, a thin film electrodisplacive member, a lower thin film electrode and an elastic member, each of the side actuators in the actuating structure further including one of the conduits, the lower thin film electrode in each of the side actuators being electrically connected to the corresponding connecting terminal;

forming an electrical connections between the upper thin film electrode in the center actuator and the lower thin film electrode in the side actuator and an electrical connection between the upper thin film electrode in the side actuator and the lower thin film electrode in the center actuator, respectively;

removing the thin film sacrificial layer; and forming an array of M×N thin film mirrors on top of the each of actuating structures to thereby form the array of M×N thin film actuated mirrors.

7. The method of claim 6, further comprises a step of depositing a passivation layer on top of the active matrix.

8. The method of claim 7, further comprises a step of depositing an etchant stopping layer on top of the passivation layer.

* * * * *